United States Patent
Leung et al.

(10) Patent No.: US 12,237,492 B2
(45) Date of Patent: Feb. 25, 2025

(54) FLEXIBLE AND PRINTABLE PAPER-BASED AL ION BATTERIES

(71) Applicant: THE UNIVERSITY OF HONG KONG, Hong Kong (HK)

(72) Inventors: Yiu Cheong Leung, Hong Kong (HK); Yifei Wang, Hong Kong (HK); Wending Pan, Hong Kong (HK)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 0 days.

(21) Appl. No.: 17/687,718

(22) Filed: Mar. 7, 2022

(65) Prior Publication Data

US 2023/0282799 A1 Sep. 7, 2023

(51) Int. Cl.
| | |
|---|---|
| *H01M 4/04* | (2006.01) |
| *H01M 4/02* | (2006.01) |
| *H01M 4/46* | (2006.01) |
| *H01M 4/583* | (2010.01) |
| *H01M 4/66* | (2006.01) |
| *H01M 10/38* | (2006.01) |

(52) U.S. Cl.
CPC ......... *H01M 4/0414* (2013.01); *H01M 4/463* (2013.01); *H01M 4/583* (2013.01); *H01M 10/38* (2013.01); *H01M 2004/027* (2013.01); *H01M 2004/028* (2013.01); *H01M 4/661* (2013.01); *H01M 4/663* (2013.01); *H01M 2220/30* (2013.01); *H01M 2300/0002* (2013.01)

(58) Field of Classification Search
CPC .... H01M 4/0414; H01M 4/463; H01M 4/583; H01M 10/38; H01M 4/661; H01M 4/663; H01M 2004/027; H01M 2004/028; H01M 2220/30; H01M 2300/0002
See application file for complete search history.

(56) References Cited

U.S. PATENT DOCUMENTS

| | | | | |
|---|---|---|---|---|
| 3,852,113 | A | * | 12/1974 | Yokota ..................... H01M 6/16 |
| | | | | 429/339 |
| 9,466,853 | B2 | | 9/2016 | Brown |
| 9,819,220 | B2 | | 10/2017 | Mukherjee |
| 9,843,070 | B2 | | 11/2017 | Dai |
| 10,122,020 | B2 | | 10/2018 | Su |
| 10,381,609 | B2 | | 7/2019 | Chamberlain |
| 10,483,542 | B2 | | 10/2019 | Zhamu |
| 2011/0129730 | A1 | * | 6/2011 | Kasai ..................... H01M 4/625 |
| | | | | 252/502 |

(Continued)

OTHER PUBLICATIONS

Rastabi et al. (Metallurgical investigation of aluminum anode behavior in water-in-salt electrolyte for aqueous aluminum batteries, J. Power Sources, 523 (2022)). (Year: 2022).*

(Continued)

*Primary Examiner* — Brian R Ohara
*Assistant Examiner* — Emily Elizabeth Freeman
(74) *Attorney, Agent, or Firm* — Amin, Turocy & Watson, LLP (57) ABSTRACT

Disclosed is a flexible battery made of a cathode comprising printable graphite, the cathode positioned on a first side of a paper; an anode comprising aluminum on a second side of the paper; an aqueous electrolyte comprising water and an aluminum halide, the aqueous electrolyte saturated within the paper; and an encapsulating film surrounding the anode and cathode.

17 Claims, 8 Drawing Sheets

(56) References Cited

U.S. PATENT DOCUMENTS

| | | | | |
|---|---|---|---|---|
| 2011/0223480 | A1* | 9/2011 | Wee | C01B 13/36 |
| | | | | 428/338 |
| 2013/0280580 | A1* | 10/2013 | Gaikwad | H01M 50/136 |
| | | | | 156/60 |
| 2017/0117511 | A1* | 4/2017 | Takahashi | H01M 50/133 |
| 2020/0004415 | A1* | 1/2020 | Warren | G06F 3/162 |
| 2020/0036033 | A1* | 1/2020 | Lin | H01M 10/446 |
| 2020/0411847 | A1* | 12/2020 | Kugler | H01M 4/0404 |
| 2021/0028452 | A1* | 1/2021 | Su | H01M 4/623 |
| 2021/0036288 | A1* | 2/2021 | Leung | H01M 50/461 |
| 2021/0104751 | A1* | 4/2021 | Gakh | H01M 4/463 |
| 2022/0013788 | A1* | 1/2022 | Zhamu | H01M 4/622 |
| 2022/0416306 | A1* | 12/2022 | Tikhonov | H01M 10/0585 |
| 2023/0111013 | A1* | 4/2023 | Zhang | H01M 10/0568 |
| | | | | 429/129 |
| 2024/0170725 | A1* | 5/2024 | Kawai | H01M 10/0568 |

OTHER PUBLICATIONS

Wang, et al, Paper-based aqueous Al ion battery with water-in-salt electrolyte, School of Mechanical Engineering and Automation, Harbin Institute of Technology, Shenzhen, China, Received Aug. 12, 2021; revised Oct. 6, 2021; accepted Oct. 12, 2021 Available online.

* cited by examiner

FLEXIBLE AND PRINTABLE PAPER-BASED AL ION BATTERIES

TECHNICAL FIELD

Disclosed are flexible batteries and methods of making the flexible batteries as well as devices comprising the flexible batteries.

BACKGROUND

With the widespread use of portable electronic devices, low-cost and environmentally-friendly energy storage units are in urgent demand. Currently, Li ion battery is the mainstream and the most mature battery technology for this mission, which, however, is restricted by many issues such as high fabrication cost, limited metal resources, battery disposal pollution and safety hazards. Regarding this, the research and development of various non-Li ion batteries are very popular in recent years, including the K ion, Na ion, Zn ion and Al ion batteries.

All the above-mentioned metal ion batteries require the use of electrolytes. Compared with the organic electrolyte, the aqueous electrolyte is favorable for its low price, high conductivity and better safety without combustion or explosion concerns. Nevertheless, not all the metal ion batteries can use aqueous electrolyte because of both the metal-water reaction during battery standby and the water electrolysis side reaction during battery recharge. In general, the more active of the metal, the less feasible of using aqueous electrolyte. Among them, the Zn metal is the most suitable choice because of its higher reduction potential (−0.76 V vs SHE) than that of $H_2$ evolution (−0.83 V vs SHE), leading to a vast study on aqueous Zn ion batteries. Alternatively, Al metal is also feasible for developing aqueous Al ion batteries, in spite of its lower reduction potential (−1.66 V vs SHE). To suppress the water electrolysis side reaction, a super-concentrated solution, called water-in-salt electrolyte, can be used, which can lower down the $H_2$ evolution potential to −2.3 V vs SHE. Compared with Zn, the Al metal is favorable because of its great abundance in the earth crust. In addition, Al has a three electron redox reaction mechanism, which can store more energy than other metals. The specific capacity of Al is as high as 2980 mA h $g^{-1}$, which is 3.6 times of Zn. As for the volumetric capacity, Al also has a 37% higher value of 8046 mAh $cm^{-3}$. Therefore, it is also very promising to develop aqueous Al ion batteries.

Recently, flexible electronics such as wearable devices are under rapid development, calling for the development of flexible power sources. These flexible energy devices will undergo frequent deformation such as bending, rolling and stretching, which has stricter requirement on the safety level. Regarding this, the above-mentioned aqueous Al ion battery is very suitable for this mission, as long as the water-in-salt electrolyte can be well stored in a thin-film pattern. To achieve this, cellulose paper can be a suitable substrate for the electrolyte storage, which can absorb the electrolyte solution first by capillary action, and then obtain the water-in-salt electrolyte by water removal through a baking process.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

As described herein, disclosed is a paper-based Al ion battery using the water-in-salt $AlCl_3$ stored in paper as electrolyte. Low cost materials such as Al foil is employed as battery anode and graphite ink printed on paper is employed as battery cathode, while the whole cell is encapsulated by plastic films. The battery performance is evaluated at room temperature by different electrochemical techniques, and the battery electrodes are characterized by SEM and XPS before and after the cycle test. In addition, the battery flexibility is examined under different types of deformations, such as bend, roll and puncture. Moreover, a two-cell battery pack is developed to accommodate the voltage output to commercial Li ion batteries. Finally, a new cell structure is described in order to improve the cycling stability.

Disclosed herein are a flexible battery made of a cathode comprising printable graphite, the cathode positioned on a first side of paper; an anode comprising aluminum on a second side of the paper; an aqueous electrolyte comprising water and an aluminum halide, the aqueous electrolyte saturated within the paper; and an encapsulating film surrounding the anode and cathode.

Also disclosed are methods of making a flexible battery involving printing a graphite ink onto a first side of paper to form a cathode; impregnating the paper with an aqueous electrolyte comprising water and an aluminum halide, the aqueous electrolyte saturated within the paper; heating the impregnated paper having the cathode thereon to obtain the water-in-salt electrolyte; affixing an anode comprising at least 95% by weight aluminum on a second side of the paper; and encapsulating the battery with a film surrounding the anode and cathode.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF SUMMARY OF THE DRAWINGS

FIG. 1 depicts the design and fabrication of the paper-based aqueous Al ion battery.

FIG. 2 reports graphically battery performance at different specific currents.

FIG. 3 reports graphically battery activation and stability.

FIG. 5 depicts SEM images of the Al anode and graphite cathode before and after the cycle test.

FIG. 6 reports graphically a flexibility study of the paper-based Al ion battery.

FIG. 8 reports graphically a new battery structure with embedded Al anode inside paper.

DETAILED DESCRIPTION

Low-cost, flexible and safe battery technology is a key to the development and application of wearable electronic devices, among which the aqueous Al ion battery with water-in-salt electrolyte is a promising candidate. As described herein, a flexible aqueous Al ion battery is developed by using cellulose paper as substrate. The water-in-salt electrolyte is stored inside the paper, while the electrodes are either printed or attached to the paper surface, leading to a lightweight and thin-film battery product. Currently, the Al ion battery can tolerate a charge and discharge rate as high as, for example, 4 A $g^{-1}$ without losing its storage capacity. Typical charge voltage is, for example, 2.2 V, while the discharge plateau of 1.6-1.8 V is among the highest values in all aqueous Al ion battery studies. The Al ion battery also possesses a high specific capacity of, for example, 140 mA h $g^{-1}$. However, due to the water electrolysis side reaction, in some instances the faradaic efficiency is only 85% with a cycle life of 250 due to the dry out of electrolyte. Benefiting from the aqueous electrolyte, the paper-based Al ion battery can tolerate various deformations such as bend, roll and even puncture without losing its performance. When two single cells are connected in series, the battery pack can provide a charge voltage, for example, of 4.3 V and a discharge plateau of 3-3.6 V, which are very close to commercial Li ion batteries. Such a low-cost, flexible and safe battery technology can be a substitute for Li ion batteries particularly in many applications, such as RFID tags, smart packages and wearable biosensors.

The materials for fabricating the paper-based Al ion battery are generally low-cost materials. Whatman™ filter paper is an example of a battery substrate, 3N pure Al foil from Aladdin® is an example of a battery anode, and $AlCl_3 \cdot 6H_2O$ from Aladdin® is an example of an electrolyte for preparation. As examples for the preparation of cathode graphite ink, the 325 mesh graphite powder, the acetylene black support, Polyvinylidene Fluoride (PVDF) binder and ethanol solvent can be purchased from Aladdin®. The current collector for the cathode side is CH-8 carbon ink from JELCON, and the external battery package is plastic film from a local stationary shop. All materials are used as received without any further treatment.

The aluminum anode is typically in foil form, but can also be in wire form, sheet form, or other suitable shape to fit withing the battery. In a preferred embodiment, the aluminum anode has smooth surface. The aluminum anode comprises aluminum or an aluminum alloy comprising aluminum and at least one element selected from the group consisting of manganese, magnesium, lithium, zirconia, iron, cobalt, tungsten, vanadium, nickel, copper, silicon, chromium, titanium, tin, and zinc In one embodiment, the aluminum anode contains at least 95% by weight aluminum. In another embodiment, the aluminum anode contains at least 99% by weight aluminum. In yet another embodiment, the aluminum anode contains at least 99.9% by weight aluminum.

The aqueous electrolyte is electrochemically stable within the operation window of the electrodes described herein. In certain embodiments, the aqueous electrolyte is capable of supporting reversible deposition and stripping of aluminum at the anode, and reversible intercalation and deintercalation of aluminum at the cathode. The aqueous electrolyte comprises water (deionized water) and an aluminum halide. Examples of aluminum halide include one or more of aluminum chloride, aluminum bromide, and aluminum iodide, though aluminum chloride is preferred. Optionally, the aqueous electrolyte contains other compounds such as one or more alkali metal hydroxides and/or one or more aluminum salts. In addition to water, the electrolyte can contain one or more of ethanol, N-methyl pyrrolidone, and dimethyl sulfoxide.

The cathode comprises a material capable of intercalating and deintercalating aluminum and chloroaluminate ions during a charge-discharge cycle. The cathode must readily incorporate Al(III), either as the $AlCl_4^-$ anion or as the Al(III) cation. The cathode typically contains a carbon based material such as graphite.

Figure 1A:
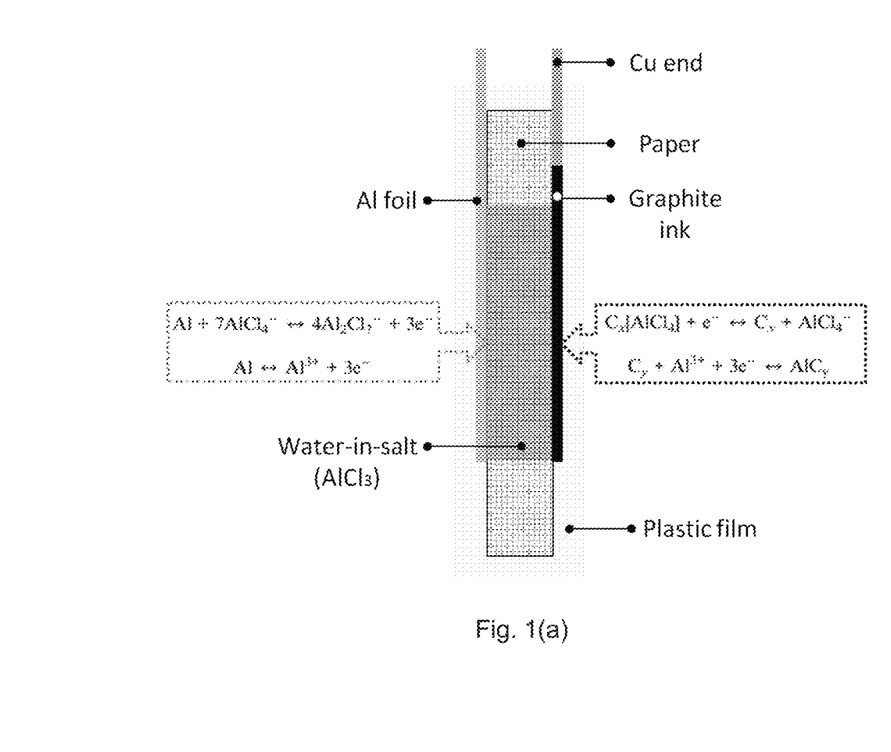
FIG. 1(a) Battery working principle.
Figure 1B:
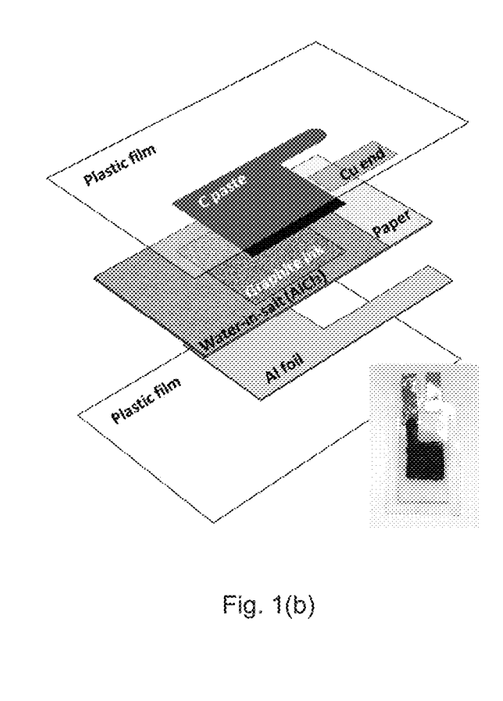
FIG. 1(b) Exploded view of the battery structure (inset: real lab prototype).

Referring to FIG. 1, it exhibits both the cross-sectional view and the exploded view of the paper-based Al ion battery. First, a graphite ink was prepared by dispersing 20 mg graphite powder, 2.5 mg PVDF and 2.5 mg acetylene black into 1 mL ethanol-water solvent (1:1), which was sonicated for 30 minutes to achieve uniformity. Next, 20 μL of the as-prepared ink was deposited onto the filter paper by a pipette and dried. To collect the current from the graphite cathode, an extra carbon ink was screen printed on the graphite cathode, both covering it and connecting it to the Cu end. After drying at 60° C. for 1 h, the battery cathode was completed. For the preparation of "water-in-salt" electrolyte, 100 μL of the saturated $AlCl_3$ solution was dropped onto the paper and absorbed uniformly. Afterwards, the saturated paper was baked at 60° C. for 30 minutes in order to remove the excess water. Finally, the Al foil anode was assembled onto the other side of paper, and the completed battery was well sealed in a plastic film. The as-fabricated paper-based Al ion battery has a weight of 0.3 g, and the estimated cost was about 0.002 USD/cell.

After assembly, the open circuit voltage (OCV) of a new battery was measured first, which was about 0.7 V. Next, the battery was charged and discharged at different specific currents for multiple cycles using a battery testing system (LAND CT3001A), until the charging voltage reached the upper limit of the testing system (5 V). For the charging process, the charge time was controlled according to the theoretical specific capacity of graphite; while for the discharging process, a limiting voltage of 0.8 V was selected to avoid the potential Al-air reaction. The stabilized battery performances after 100 cycles were used to study the effect of specific currents, which was normalized by the mass of graphite inside the cathode (0.4 mg). The charge and discharge specific capacities were also normalized by the same way. In addition to the cycle test, the rate test was also conducted by charging the battery constantly at 1 A $g^{-1}$ and discharging it at different specific currents from 0.25 to 4 A $g^{-1}$. Moreover, CV test was also conducted by scanning the battery between 0-3.5 V with a scan rate of 50 mV $s^{-1}$.

To characterize the battery cathode, which is directly responsible for the intercalation and de-intercalation of Al and chloroaluminate ions during battery charge and discharge, a special battery design was employed by using carbon paper-supported graphite instead of printed graphite as the cathode. In this manner, both the Al anode and graphite cathode after 100 cycles at 1 A g$^{-1}$ could be taken out and fully rinsed for further characterization. First, X-ray photoelectron spectroscopy (XPS) was adopted to study the bonding status of different elements (C, Al, Cl) inside the graphite cathode. Next, surface morphology of the electrodes was compared before and after the cycle test using scanning electron microscopy (SEM).

Figure 2A:
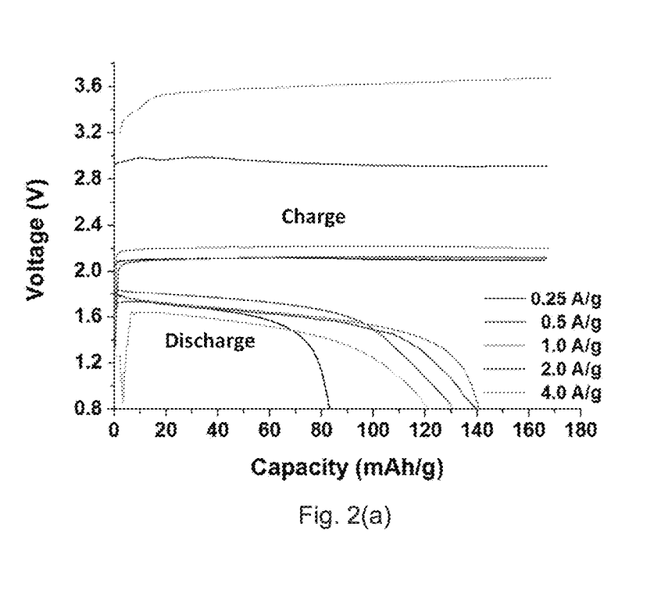
FIG. 2(a) Charge and discharge curves at 0.25-4.0 A g-1.

According to a previous study, the theoretical specific capacity of graphite for Al ion intercalation was about 165 mA h g$^{-1}$. Therefore, as described herein, the charging capacity was controlled to be 165 mA h g$^{-1}$, leading to different charging time for different specific currents (that is, 40 min for 0.25 A g$^{-1}$, 20 min for 0.5 A g$^{-1}$, 10 min for 1 A g$^{-1}$, etc.). Referring to FIG. 2(a), the paper-based Al ion battery exhibited a discharge plateau of 1.6-1.8 V, which was quite high compared with other aqueous Al ion batteries in literature. The discharge specific capacity was about 140 mA h g$^{-1}$, indicating that part of the energy input during charging was wasted due to other parasitic reactions, such as the water electrolysis reaction. As for the charging voltage, the value was 2.0-2.2 V when lower specific currents were selected, which could rise to above 3 V when the specific current exceeded 1 A g$^{-1}$. Therefore, a moderate charging rate of 1 A g$^{-1}$ (6 C) was optimal for the paper-based Al ion battery, which can achieve a good balance between charging time and charging voltage.

Figure 2B:
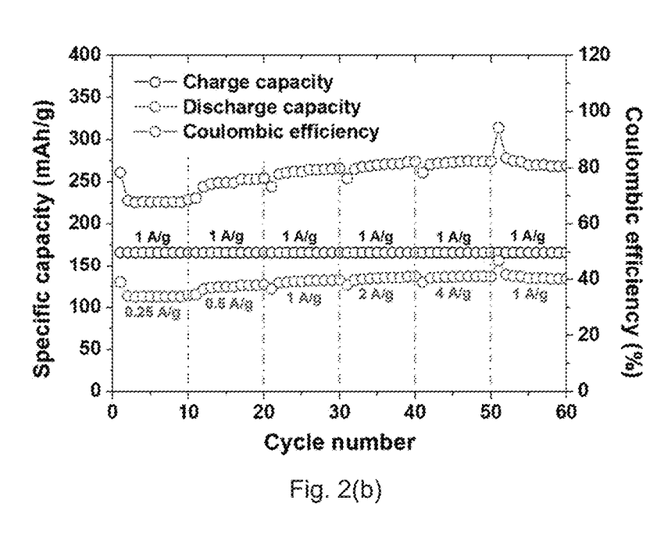
FIG. 2(b) Rate test with a constant charge rate of 1 A g-1.

Referring to FIG. 2(b), FIG. 2(b) shows the rate test of the battery, which was constantly charged at 1 A g$^{-1}$ and discharged at different rates continuously. Apparently, the paper-based Al ion battery could undertake different discharge rates without losing the capacity, and the coulombic efficiency was around 80%. At lower discharge rates, the discharge capacity was slightly lower, which was consistent with the result in FIG. 2(a). The loss of efficiency could be due to the water electrolysis reaction during the battery charging, which was mainly originated from the water content inside the water-in-salt electrolyte.

Figure 3A:
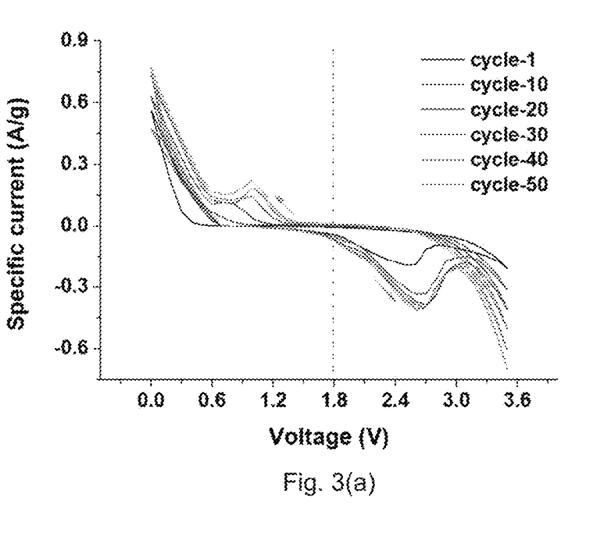
FIG. 3(a) CV curves of a new battery between 0-3.5 V.
Figure 3B:
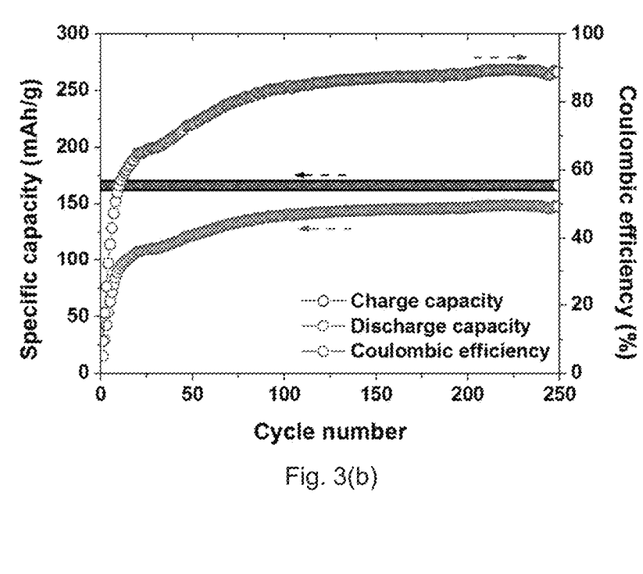
FIG. 3(b) Cycle stability of a new battery at 1 A g-1, together with faradaic efficiency.

During the cycle test, a battery activation process was observed for each new battery, which generally took 100 cycles before the discharge capacity reached the maximum value. This phenomenon was also observed in the CV test as shown in FIG. 3(a). With more and more scanning cycles, both the charge and discharge peaks increased, indicating that the battery was gradually activated by the cycling process. Referring to FIG. 3(b), FIG. 3(b) gives a more direct proof of the battery activation process. The battery was cycled at 1 A g$^{-1}$ continuously, until the charging voltage increased to 5 V and the test was stopped by the testing system. At the first 25 cycles, both the discharge capacity and the coulombic efficiency increased dramatically. Afterwards, the values kept increasing until reaching a steady value at 100 cycles, which was continued for another 150 cycles until the charging voltage reached 5 V. Therefore, the present paper-based Al ion battery can survive for 250 cycles in total. The increase of charging voltage is due to the loss of water by the water electrolysis side reaction, which led to an elevation of the battery ionic resistance. To substantiate this disadvantage, a water injection test was conducted for the dead battery, and the charging voltage was found to be recovered to 2.2 V immediately.

Figure 4:
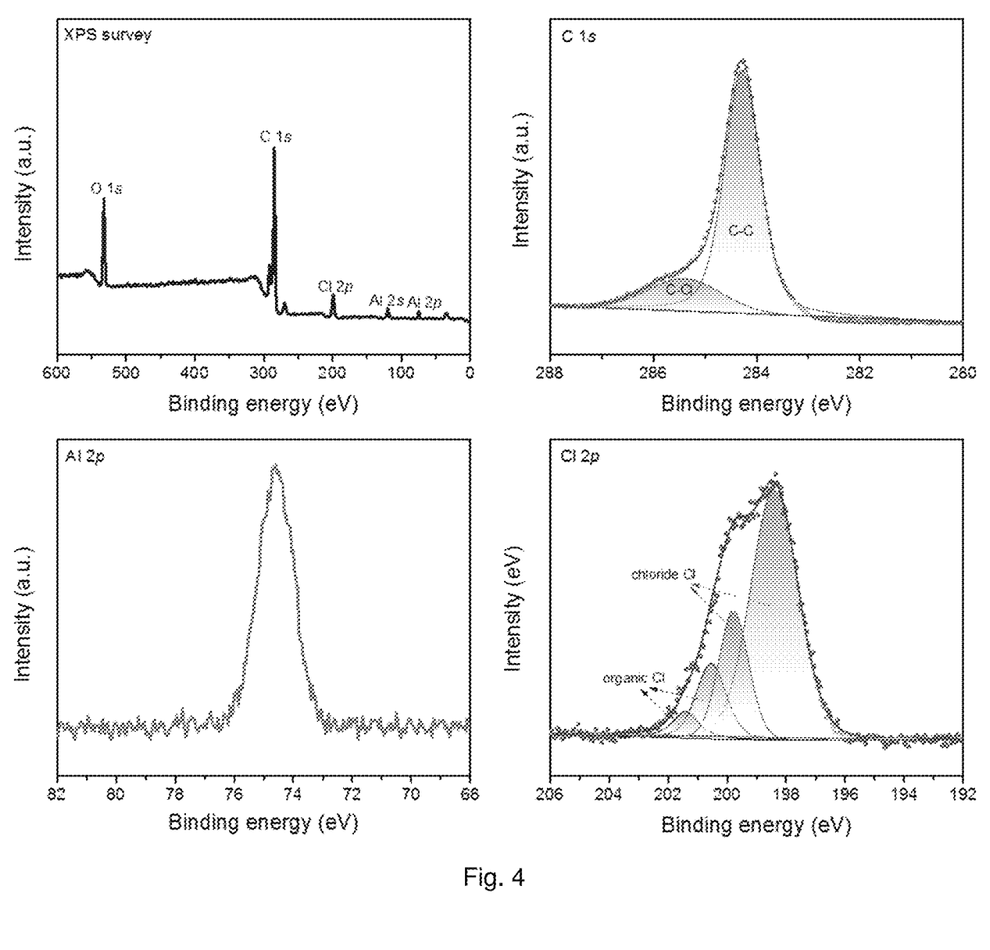
FIG. 4 reports graphically XPS result of the C 1s, Al 2p and Cl 2p peaks in the graphite cathode after the cycle test.
Figure 5A:
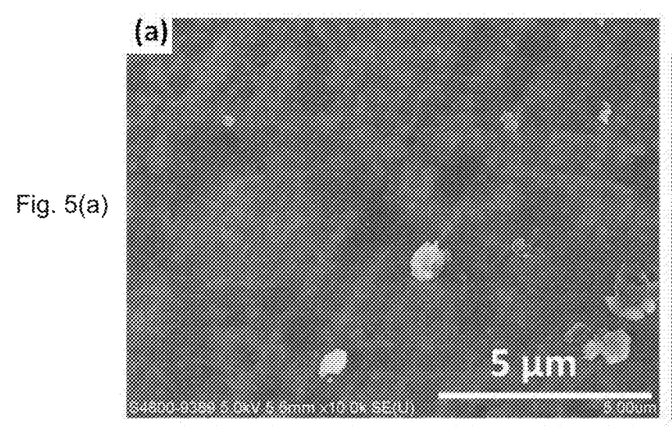
FIG. 5(a) Al anode before cycle.
Figure 5B:
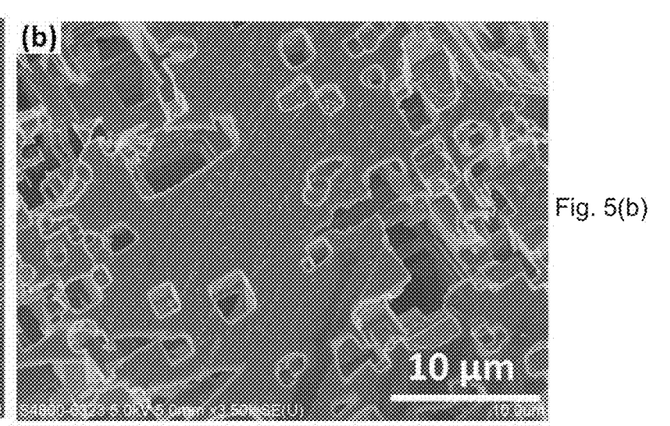
FIG. 5(b) Al anode after cycle.
Figure 5C:
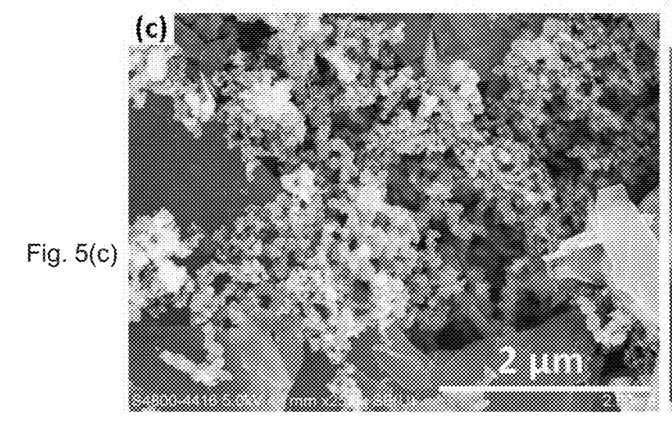
FIG. 5(c) Graphite cathode before cycle.
Figure 5D:
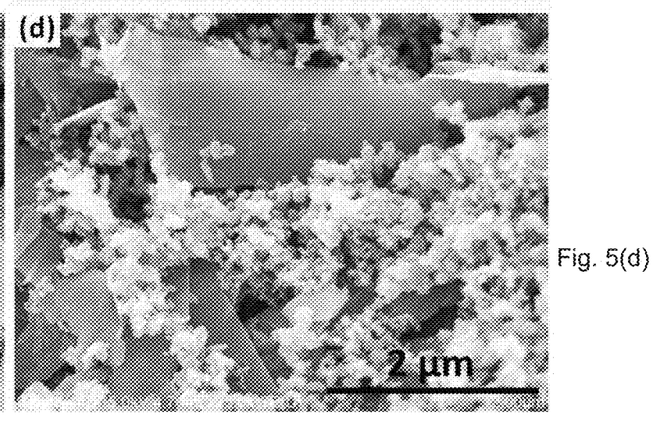
FIG. 5(d) Graphite cathode after cycle.

After the cycle test, the carbon paper-supported graphite cathode was detached from the battery and fully rinsed by DI water before carrying out the XPS test. FIG. 4 shows the bonding status of different elements in the graphite. In general, four elements of C, O, Al and Cl were detected in the cycled graphite. For the C element, in addition to the C—C main peak at 284.3 eV representing the graphite, the C—Cl peak at 285.3 eV was also observed, indicating the possible reaction between the graphite and the chlorine aluminate. For the Al element, the peak at 74.6 eV corresponds to the formation of Al oxide, indicating the existence of water electrolysis side reaction at the Al surface. As for the Cl element, in addition to the two main peaks representing the chloride Cl, another two small peaks at 200.6 and 201.3 eV represent the organic Cl, which should be the C—Cl bond. To sum up, the XPS results can prove the intercalation of Al and Cl-containing ions during the battery cycle test, which should be the Al$^{3+}$, AlCl$^{4-}$ and Al$_2$Cl$_7^-$ according to a previous study.

FIG. 5 compares the surface morphology of the Al anode and graphite cathode before and after the cycle test. Apparently, the pristine flat Al surface in FIG. 5(a) was corroded by the water electrolysis side reaction, leading to a bumpy surface with micro holes in FIG. 5(b). As for the cathode, the large graphite flakes connected by acetylene black micro particles did not change at all before and after the discharge (FIGS. 5(c) and 5(d)). In conclusion, the anode and cathode should not be the reason behind the poor cycle stability of the present battery, while the water loss in water-in-salt electrolyte should be the major issue for the paper-based Al ion battery.

Figure 6A:
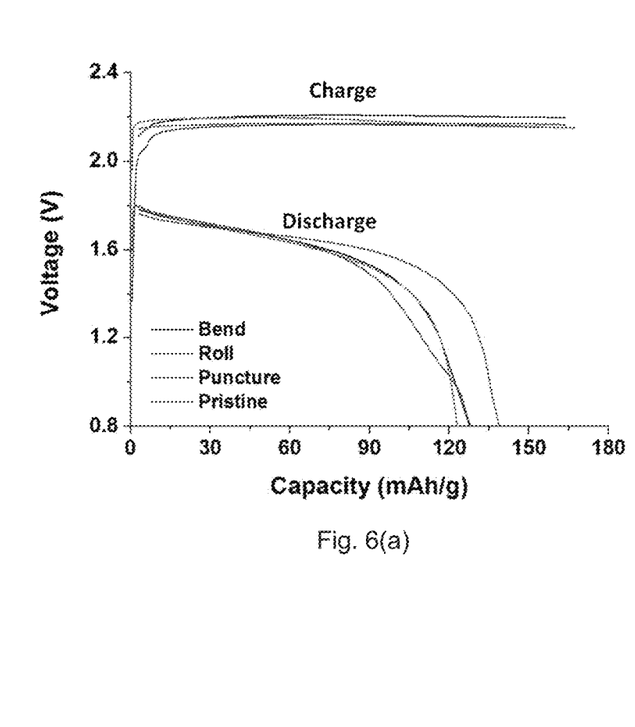
FIG. 6(a) Battery performance under different types of deformation.
Figure 6B:
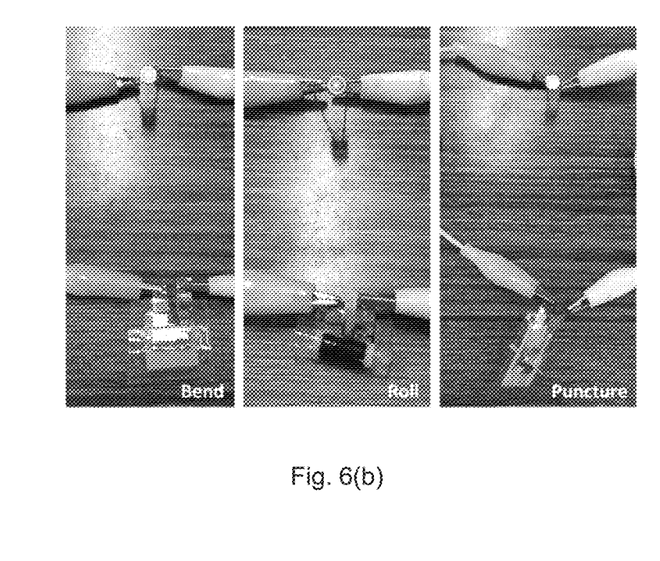
FIG. 6(b) depicts a demonstration of a LED light powered by deformed batteries.

Battery flexibility is next discussed. By using filter paper as substrate and water-in-salt AlCl$_3$ as aqueous electrolyte, the present paper-based Al ion battery is intrinsically flexible and highly safe against various deformations, which is promising for powering flexible and wearable electronic devices. As shown in FIG. 6(a), when the battery was bended, rolled or even punctured by a needle, the battery performance was not varied evidently. The charging voltage was still 2.2 V, and the discharge plateau was maintained at 1.6-1.8 V, together with a discharge capacity of 120-140 mA h g$^{-1}$. FIG. 6(b) demonstrates a LED light powered by the paper-based Al ion battery at different deformation status, which further demonstrates its advantageous flexibility and robustness in practical applications.

Figure 7:
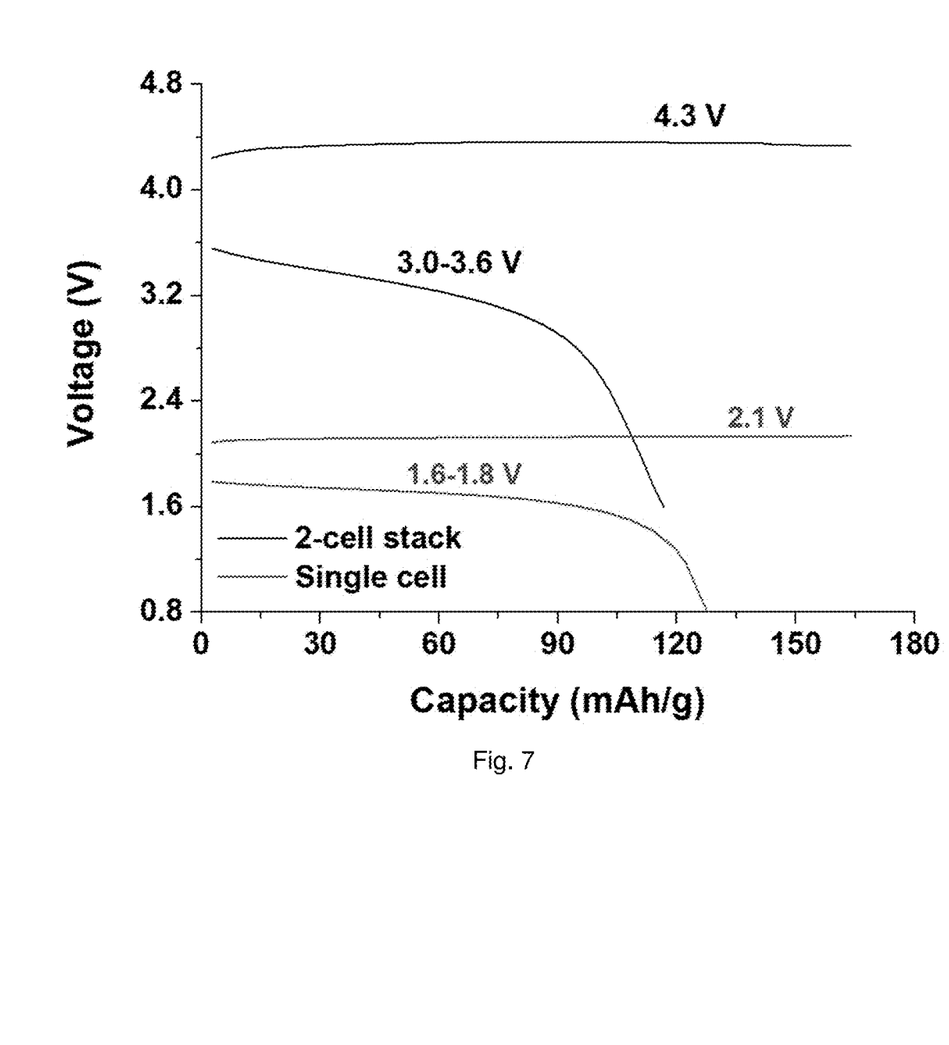
FIG. 7 reports graphically a comparison between a paper-based Al ion single battery and a 2-cell battery pack.

With regard to battery stacking, currently, the portable electronic market is dominated by Li ion batteries, which generally have a charge voltage of 3.6-4.2 V and a discharge voltage of 3.2-3.7 V. To accommodate this mature market, the present paper-based Al ion battery should be stacked in order to meet the voltage requirement. As shown in FIG. 7, a 2-cell battery pack connected in series could provide a charging voltage of 4.3 V and a discharge plateau of 3.0-3.6 V, which were very close to the values of Li ion batteries. As for the discharge capacity, a slight decrease of 9% was observed for the 2-cell battery pack, which can be due to the performance difference between the single cells, and the extra ohmic loss from the connection. In conclusion, it is believed that the paper-based Al ion battery pack is very promising for substituting some of the Li ion batteries in low-cost and flexible electronic devices, especially those with large quality and less cycling times, such as RFID tags, smart packages and wearable medical sensors, among other applications.

Figure 8A:
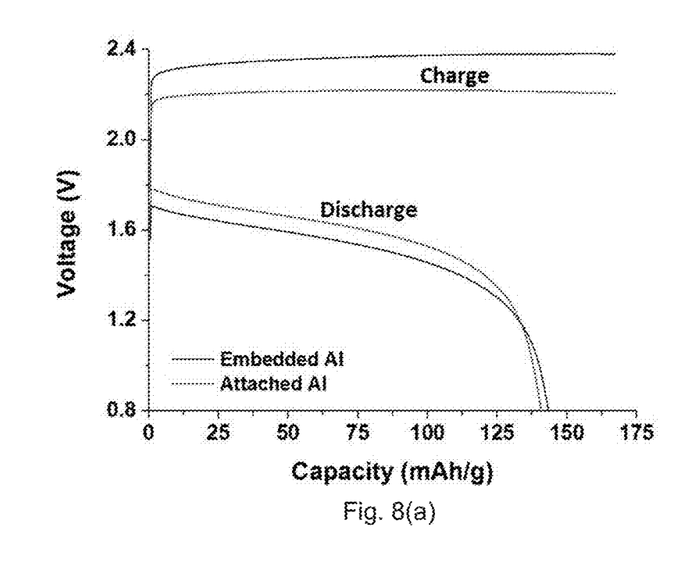
FIG. 8(a) comparison of battery performance between the cell with attached Al and the cell with embedded Al.
Figure 8B:
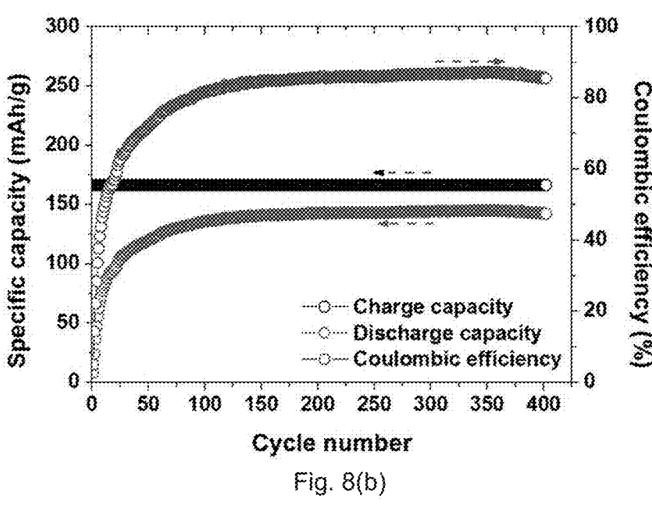
FIG. 8(b) Improved cycle stability.

Another battery structure is now described. To improve the contact between the Al anode and the paper-based water-in-salt electrolyte, an Al embedding technique was used by storing the Al foil inside the paper substrate during paper making process. Afterwards, the graphite ink and carbon paste was printed onto the paper surface as battery cathode. The as-prepared device was immersed in the saturated $AlCl_3$ solution to allow sufficient electrolyte uptake, which was next baked at 60° C. for 30 minutes to obtain the water-in-salt electrolyte. FIG. 8(a) compares the performance between batteries with either the previous attached Al anode and the present embedded Al anode. The latter cell obtained slightly higher charging voltage and lower discharge plateau, which is typically be due to the higher thickness of the home-made paper. Nevertheless, the battery cycling stability was significantly improved as shown in FIG. 8(b). The cycle time before charging voltage reached 5 V was increased from 250 to 400 times, which was mainly attributed to the higher electrolyte storage capacity of the new battery structure. After battery failure, the water injection test was also conducted, and the battery can be fully recovered to its original status.

As described herein, a paper-based aqueous Al ion battery is proposed for the first time by storing a water-in-salt electrolyte inside a paper substrate. The graphite cathode is directly printed onto the paper surface, while the Al foil anode is either attached on the paper or embedded inside. This low-cost and simple battery technology can provide a voltage output of 1.6-1.8 V and a specific capacity of 140 mA h $g^{-1}$, which are among the highest in aqueous Al ion batteries. The charge-discharge faradaic efficiency is around 85% due to the water electrolysis side reaction, which is also the reason behind its limited cycle lifetime (250 cycles). Nevertheless, this value can be improved to 400 cycles if more electrolytes are stored inside the paper. The present paper-based Al ion battery is also robust against various deformations including bending, rolling and puncture, which can maintain its pristine performance without burning or explosion issues. When two cells are connected in series, a working voltage range close to commercial Li ion batteries can be obtained. Such a low-cost and environmentally-friendly battery technology is a promising candidate for powering massive RFID tags, smart packages, and wearable biosensors. Wearable devices, which benefit from components having flexibility and/or bendability, are particularly suited to contain the batteries described herein.

Unless otherwise indicated in the examples and elsewhere in the specification and claims, all parts and percentages are by weight, all temperatures are in degrees Centigrade, and pressure is at or near atmospheric pressure.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A flexible battery, comprising:
    an ink-based cathode comprising graphite, the cathode positioned on a side of a cellulose paper;
    an anode comprising aluminum foil, the anode embedded in the cellulose paper;
    an aqueous electrolyte comprising water and an aluminum halide, the aqueous electrolyte saturated within the cellulose paper; and
    an encapsulating film surrounding the anode and cathode that seals the flexible battery.

2. The flexible battery according to claim 1, wherein the cathode comprises graphite powder, an acetylene black support and a polyvinylidene fluoride binder.

3. The flexible battery according to claim 1, wherein the cellulose paper is filter paper.

4. The flexible battery according to claim 1, wherein the anode comprises at least 95% by weight aluminum.

5. The flexible battery according to claim 1, wherein the aluminum halide is aluminum chloride.

6. The flexible battery according to claim 1, wherein the aqueous electrolyte is baked to obtain the water-in-salt form.

7. The flexible battery according to claim 1, further comprising:
    a cathode current collector comprising carbon electrically connected to the cathode; and
    an anode current collector comprising aluminum electrically connected to the anode.

8. The flexible battery according to claim 1, wherein the flexible battery can tolerate various deformations such as bending, rolling, and puncturing.

9. A wearable electronic device comprising the flexible battery according to claim 1, such as RFID tags, smart packages and wearable biosensors.

10. A method of making a flexible battery, comprising:
    printing a graphite ink onto a side of a cellulose paper to form a cathode;
    impregnating the cellulose paper with an aqueous electrolyte comprising water and an aluminum halide, the aqueous electrolyte saturated within the paper;
    heating the impregnated paper having the cathode thereon to obtain the water-in-salt electrolyte;
    affixing an aluminum foil embedded in the paper to form an anode; and
    encapsulating the battery with a film surrounding the anode and cathode that seals the flexible battery.

11. The method according to claim 10, wherein the graphite ink comprises graphite powder, acetylene black support, a polyvinylidene fluoride binder, and ethanol solvent.

12. The method according to claim 10, wherein heating the impregnated paper having the cathode thereon comprises heating at a temperature of at least 60° C. for at least 30 minutes.

13. The method according to claim 10, wherein the anode is aluminum foil comprising at least 95% by weight aluminum.

14. The method according to claim 10, wherein the aluminum halide is aluminum chloride.

15. The method according to claim 10, further comprising after printing the graphite ink and before impregnating the cellulose paper:
    printing a carbon-based current collector on graphite cathode and drying at 60° C. for at least 1 hour.

16. The method according to claim 10, wherein the anode can also be embedded inside the cellulose paper during paper-making process.

17. The method according to claim 10, wherein the anode and cathode are encapsulated with a plastic film.

* * * * *